United States Patent [19]
Lewis et al.

[11] Patent Number: 5,307,523
[45] Date of Patent: May 3, 1994

[54] PROTECTIVE EYEWEAR

[75] Inventors: James M. Lewis, Garden Grove; Thomas A. Safstrom, Orange; Gary E. Tippitt, Arcadia, all of Calif.

[73] Assignee: California SunCare, Inc., Los Angeles, Calif.

[21] Appl. No.: 116,805

[22] Filed: Aug. 19, 1993

Related U.S. Application Data

[63] Continuation of Ser. No. 870,995, Apr. 20, 1992, abandoned.

[51] Int. Cl.$^5$ .............................................. A61F 9/02
[52] U.S. Cl. ......................................... 2/433; 2/439; 2/440; 2/445
[58] Field of Search ............... 2/15, 11, 431, 433, 2/439, 440, 445, 452, 12, , 446, 426, 432, 441, 442, 447, 454; 351/44, 45

[56] References Cited

U.S. PATENT DOCUMENTS

| | | |
|---|---|---|
| 1,037,473 | 9/1912 | Gruenberger . |
| 1,471,562 | 10/1923 | Malcom ................................. 2/441 |
| 1,588,775 | 6/1926 | Schumacher ........................ 2/441 |
| 1,982,650 | 2/1934 | Fletcher . |
| 2,598,107 | 5/1952 | Brandvig . |
| 2,844,994 | 7/1958 | Filler . |
| 2,846,684 | 8/1958 | Hill ......................................... 2/441 |
| 3,020,552 | 2/1962 | Coon ......................................... 2/15 |
| 3,261,652 | 7/1966 | Magnus ................................. 2/433 |
| 3,673,610 | 7/1972 | Liautaud ................................. 2/452 |
| 4,162,542 | 7/1979 | Frank ......................................... 2/15 |
| 4,468,819 | 9/1984 | Ohno ..................................... 2/445 |
| 4,656,668 | 4/1987 | Castrejon . |
| 5,046,199 | 9/1991 | Hall ......................................... 2/445 |

FOREIGN PATENT DOCUMENTS 1118953 2/1982 Canada ..................................... 2/426

Primary Examiner—Clifford D. Crowder
Assistant Examiner—Michael A. Neas
Attorney, Agent, or Firm—Harris, Wallen, MacDermott & Tinsley

[57] ABSTRACT

An eye protection device comprising two eye cups joined by a bridge with the eye cups being mirror images of each other, each of the eye cups being generally oblong as viewed from the front with longer tops and bottoms and shorter inner and outer sides, each of the eye cups having a substantially flat front surface with an opening and a lens positioned in the opening, with the outer side of each of the eye cups projecting rearwardly at least about twice as far as the inner side and with the top and bottom of each of the eye cups having concave curved rear edges, with the bridge and the eye cup tops substantially in parallel horizontal planes, and with the bridge having an arch extending forwardly of the eye cups at least about the length of the eye cup inner edges. In the preferred embodiment, the design is a molded unitary piece.

5 Claims, 1 Drawing Sheet

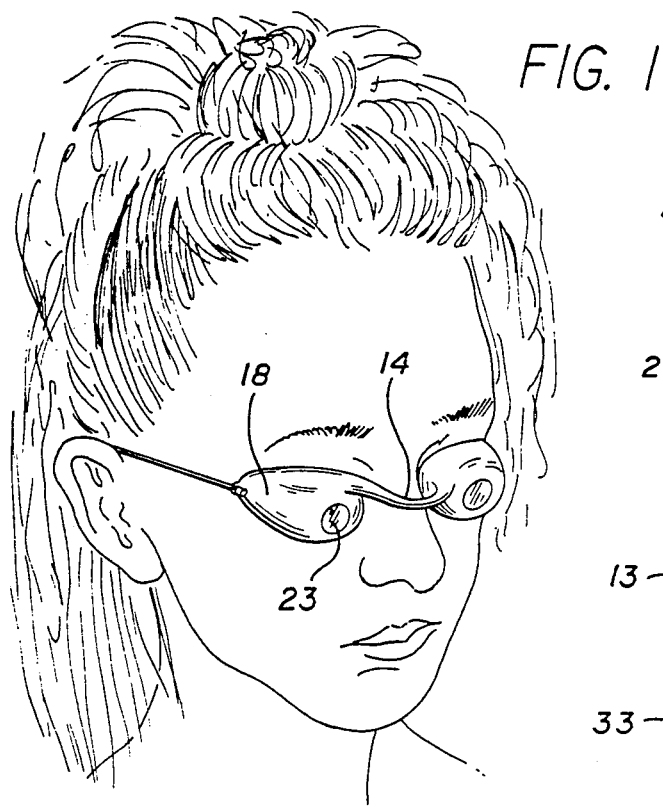
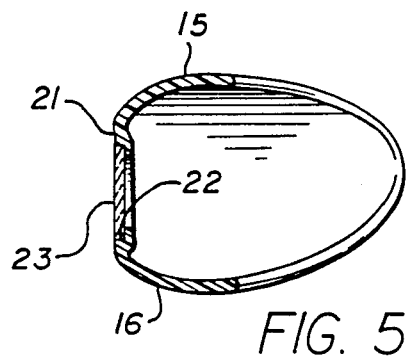
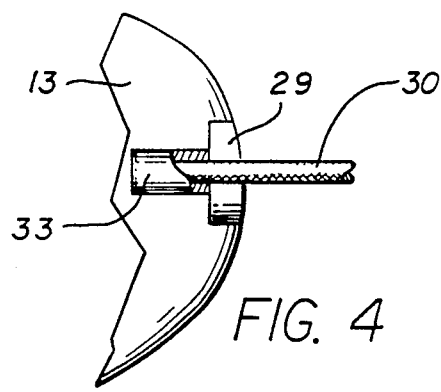
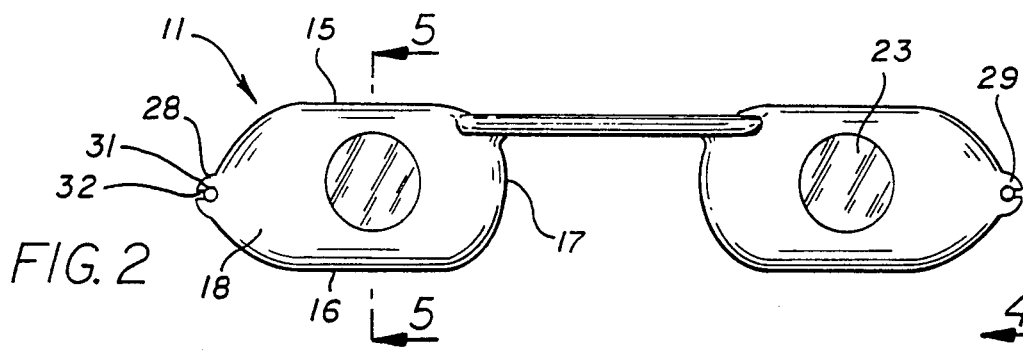
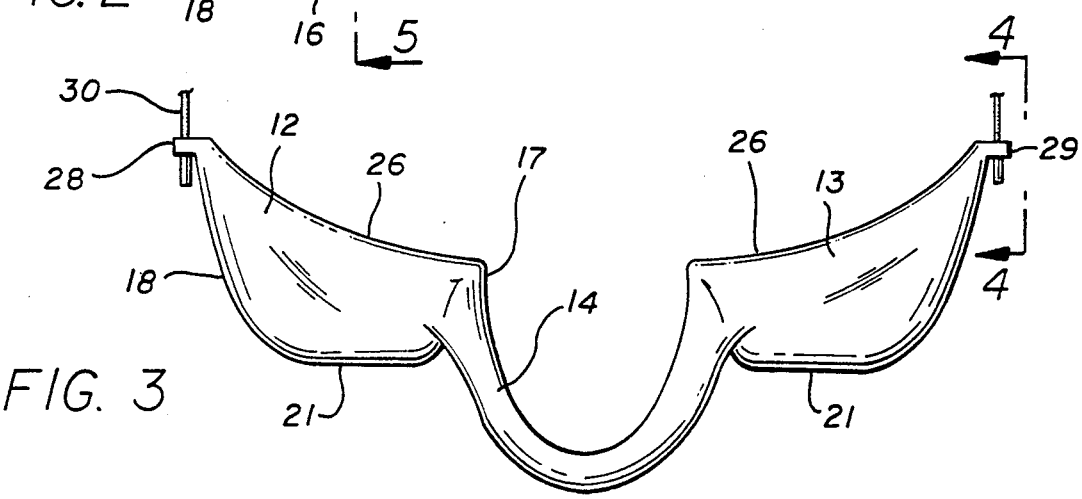

PROTECTIVE EYEWEAR

BACKGROUND OF THE INVENTION

This application is a continuation of Ser. No. 07/870,995, now abandoned that relates to eye protection devices and in particular, to a new and improved device which is small, light in weight and which fits closely over the eyes.

A variety of eye protection devices have been proposed incorporating various arrangements for covering the eyes and sometimes adjacent portions of the wearers face. Some o the prior art designs do not fit comfortably, some protect the eyes only from light coming from the front of the wearer, some cover the eyes of the wearer but also cover other portions of the wearers face, some do to fit very well, and some are very uncomfortable to the wearer.

It is an object of the present invention to provide a new and impoved eye protection device which will protect the wearer's eyes in all directions from light, wind and dust, and at the same time be light in weight, inexpensive, and very comfortable for long term wear. Another object of the invention is to provide such a protective device which is opaque with a lens at each eye to provide some visibility for the wearer. It is an additional object of the invention to provide such a protective device having individual eye cups joined by a nose bridge which does not directly contact the wearers face thereby eliminating loading on the wearers nose and nose discomfort and avoiding the white fine in a sun tan which some people dislike One more object is to provide such a protective device which is readily held n place with a small elastic band fitted around the wearer's head.

Other objects, advantages, features and results will more fully appear in the course of the following description.

SUMMARY OF THE INVENTION

An eye protection device comprising two eye cups joined by a bridge with the eye cups being mirror images of each other, each of the eye cups being generally oblong as viewed from the front with longer tops and bottoms and shorter inner and outer sides, each of the eye cups having a substantially flat front surface with an opening and a lens positioned in the opening, with the outer side of each of the eye cups projecting rearwardly at least about twice as far as the inner side, with the top and bottom of each of the eye cups having concave curved rear edges, and with the bridge and the eye cup tops substantially in parallel horizontal planes. Preferably the bridge has an arch extending forwardly of the eye cups at least about the length of the eye cup inner edges.

In the preferred embodiment, the design is a molded unitary piece.

BRIEF DESCRIPTION OF THE DRAWING

FIG. 1 is a view of a person wearing the presently preferred embodiment of the eye protection device of the invention;

FIG. 2 is an enlarged front view of the device of FIG. 1;

FIG. 3 is a top view of the device of FIG. 2;

FIG. 4 is an enlarged partial view taken along the line 4—4 of FIG. 3; and

FIG. 5 is a sectional view taken along the line 5—5 of FIG. 2

DESCRIPTION OF THE PREFERRED EMBODIMENT

The eye protection device 11 has eye cups 12,13 joined by a bridge 14. The eye cups are mirror images of each other, and each of the eye cups 12,13 is generally oblong as viewed from the front and shown in FIG. 2.

Each of the eye cups has a top 15, a bottom 16, an inner side 17, and an outer side 18. The tops and bottoms of the oblong eye cups are longer than the inner and outer sides.

Each of the eye cups has a substantially flat front 21 and preferably includes a stepped opening 22 for carrying a lens 23.

The outer side 18 of each of the eye cups projects rearwardly further than the inner side 17, as seen in FIG. 3, with the outer side preferably projected rearwardly at least about twice as far as the inner side. The top 15 and bottom 16 of each of the eye cups has a concave curved rear edge 26, as best seen in FIG. 3.

The bridge 14 is arched forward, as seen in FIGS. 1 and 3, so as to avoid all contact with the wearers nose. Preferably this arch extends forward at least about the length of the eye cup's inner edges 17.

In the preferred embodiment illustrated, the bridge is flat and lies substantially in a horizontal plane parallel to the plane of the tops 15 of the eye cups. Extensions 28,29 are provided at the rear end of the outer side 18 of each of the eye cups, for attachment of an elastic band 30 for holding the device in position on the wearer's face. In the embodiment illustrated, a central opening 31 is provided in each extension, with a slot 32 extending from the opening to the exterior of the projection. With this construction, the band 30 is readily pushed through the slot into the central opening of each of the projections, with an enlarged end 33 at each end of the elastic band, serving as stops.

The construction of the eye protection device as illustrated is especially well suited to plastic molding, and in the preferred embodiment, the device is molded as a unitary plastic piece.

With the unique construction described and illustrated, each of the eye cups fits snugly around the eye of the wearer so that there is little or no space for light or wind or dust to enter the interior of the eye cup and disturb the wearer. At the same time, the eye cups with their unique shape fit comfortably around the wearer's eye, without requiring any contact with the wearer's nose. The transmissivity of the lens can be selected as desired for the specific end use, such as low transmissivity for a tanning salon, with somewhat higher transmissivity for beach or outdoor wear. The device is readily suited for manufacture by plastic molding as a unitary piece, thereby being light in weight and relatively inexpensive to manufacture.

We claim:

1. A device for protecting a wearer's eyes against light comprising first and second eye cups joined together by a bridge, with said eye cups being mirror images of each other, each of said eye cups being generally oblong as viewed from the front with a flat top and a flat bottom joined by inner and outer sides, with said inner and outer sides of each of said oblong eye cups shorter than said top and bottom of said eye cup so that said top will fit below the brow of the wearer and said bottom will fit above the cheekbone of the wearer when the device is in place on the wearer, with said inner and outer sides of each of said eye cups having a front-to-rear length to form a substantially flat front surface with a lens opening and a lens positioned in said lens opening, with said outer side of each of said eye cups projecting rearwardly at least about twice as far as said inner side and with said top and bottom of each of said eye cups having concave curved rear edges, and with said bridge and said eye cup tops substantially in parallel horizontal planes, and with said bridge having an arch extending forwardly of said eye cups so that said eye cups and bridge do not contact the wearer's nose when the device is in place on the wearer;

said eye protection device being a unitary molded piece with said top, bottom and sides forming a closed cup except for the said lens opening.

2. An eye protection device as defined in claim 1 with said bridge having an arch extending forwardly of said eye cups at least about the length of said eye cup inner edges.

3. An eye protection device as defined in claim 1 including a projection at the rearward end of said outer sides for receiving a head attachment band.

4. An eye protection device as defined in claim 3 wherein each of said projections has means defining a single cylindrical opening and a slot parallel to the axis of said cylindrical opening and extending between said opening and the exterior of said projection.

5. A device for protecting a wearer's eyes against light comprising first and second eye cups joined together in a fixed relation by a bridge, with said eye cups being mirror images of each other, each of said eye cups being generally oblong as viewed from the front with a top and a bottom joined by inner and outer sides, with said inner and outer sides of each of said oblong eye cups shorter than said top and bottom of said eye cups so that said top will fit below the brow of the wearer and said bottom will fit above the cheekbone of the wearer when the device is in place on the wearer, each of said eye cups having a substantially flat surface with a lens opening and a lens positioned in said lens opening, with said outer side of each of said eye cups projecting rearwardly at least about twice as far as said inner side and with said top and bottom of each of said eye cups having concave curved rear edges, and with said bridge and said eye cup tops substantially in parallel horizontal planes, and with said bridge having an arch extending forwardly of said eye cups so that said bridge does not contract the wearer's face when the device is in place on the wearer, said eye protection device being a unitary molded piece with said top, bottom and sides forming a closed cup except for the said lens opening, a projection at the rearward end of each of said outer sides for receiving ahead attachment band, with each of said projections having means defining a single cylindrical opening and a slot parallel to the axis of said cylindrical opening and extending between said opening and the exterior of said projection, and with said head attachment band having an elastic line of a diameter to pass through said slots and enlarged ends of a size to not pass through said cylindrical openings.

* * * * *